(12) United States Patent
Jiang et al.

(10) Patent No.: US 12,500,439 B2
(45) Date of Patent: *Dec. 16, 2025

(54) POWER SUPPLY DEVICE AND CHARGING CONTROL METHOD

(71) Applicant: GUANGDONG OPPO MOBILE TELECOMMUNICATIONS CORP., LTD., Dongguan (CN)

(72) Inventors: Senlong Jiang, Dongguan (CN); Jialiang Zhang, Dongguan (CN); Chen Tian, Dongguan (CN); Chih-Wei Chiu, Dongguan (CN); Jun Zhang, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 577 days.

This patent is subject to a terminal disclaimer.

(21) Appl. No.: 17/941,699

(22) Filed: Sep. 9, 2022

(65) Prior Publication Data

US 2023/0006462 A1    Jan. 5, 2023

Related U.S. Application Data

(63) Continuation of application No. PCT/CN2021/078592, filed on Mar. 2, 2021.

(30) Foreign Application Priority Data

Mar. 12, 2020    (CN) .......................... 202010172279.7

(51) Int. Cl.
  *H02J 7/04*    (2006.01)
  *H02J 7/06*    (2006.01)
(Continued)

(52) U.S. Cl.
  CPC .................................. *H02J 7/04* (2013.01); *H02J 7/06* (2013.01); *H02M 3/33523* (2013.01);
(Continued)

(58) Field of Classification Search
  CPC ......................................................... H02J 7/04
(Continued)

(56) References Cited

U.S. PATENT DOCUMENTS 9,502,921 B2 * 11/2016 Bucher ..................... H04B 5/79
2008/0112199 A1 * 5/2008 Xiao ................. H02M 3/33523
                                                                    323/282
(Continued)

FOREIGN PATENT DOCUMENTS

CN    101399498 A    4/2009
CN    107895989 A    4/2018
(Continued)

OTHER PUBLICATIONS

Rejection Decision dated Aug. 11, 2022 from Chinese patent Application No. 202010172279.7.
(Continued)

*Primary Examiner* — Jerry D Robbins
(74) *Attorney, Agent, or Firm* — Quarles & Brady LLP

(57) ABSTRACT

A power supply device includes a transformer, a first rectifier, a voltage conversion module, and a control unit. The first rectifier is connected to a primary winding of the transformer, converts a received alternating-current voltage to a first direct-current voltage. The transformer is configured to convert the first direct-current voltage to a second direct-current voltage. The voltage conversion module is connected to the secondary winding of the transformer and configured to convert the second direct-current voltage to output a third direct-current voltage. The control unit, connected to the voltage conversion module, controls the volt-
(Continued)

age conversion module to adjust an output voltage or an output current of the power supply device.

20 Claims, 12 Drawing Sheets

(51) Int. Cl.
   *H02M 3/335* (2006.01)
   *H02J 7/00* (2006.01)
(52) U.S. Cl.
   CPC ..... *H02J 7/00712* (2020.01); *H02J 7/007194* (2020.01); *H02J 2207/20* (2020.01)
(58) Field of Classification Search
   USPC .......................................................... 320/108
   See application file for complete search history.

(56) References Cited

U.S. PATENT DOCUMENTS

| | | | |
|---|---|---|---|
| 2008/0197811 | A1 | 8/2008 | Hartular et al. |
| 2009/0141519 | A1* | 6/2009 | Hong ................ H02M 3/33576 363/21.01 |
| 2015/0372499 | A1* | 12/2015 | Purcarea .................. H02J 7/02 307/104 |
| 2018/0062423 | A1* | 3/2018 | Zhang .................. H02J 7/1492 |

FOREIGN PATENT DOCUMENTS

| | | |
|---|---|---|
| CN | 108539832 A | 9/2018 |
| CN | 109075703 A | 12/2018 |
| CN | 110829551 A | 2/2020 |
| EP | 2919358 A1 | 9/2015 |
| EP | 3309924 A1 | 4/2018 |
| EP | 3557747 A1 | 10/2019 |
| WO | 2019056317 A1 | 3/2019 |

OTHER PUBLICATIONS

The Notice of Reexamination dated Oct. 23, 2023 from Chinese patent application No. 202010172279.7.
The Review Decision Letter dated Nov. 29, 2023 from Chinese patent application No. 202010172279.7.
International Search Report and the Written Opinion dated May 28, 2021 from the International Searching Authority Re. Application No. PCT/CN2021/078592.
The First Office Action dated Mar. 11, 2022 from Chinese patent Application No. 202010172279.7.
The supplementary European search report dated Aug. 16, 2023 from European patent Application No. 21768582.5.
The Office Action dated May 27, 2025 from the European Application No. 21768582.5.

* cited by examiner

POWER SUPPLY DEVICE AND CHARGING CONTROL METHOD

CROSS REFERENCE OF RELATED APPLICATION

This application is a continuation application of an International Application No. PCT/CN2021/078592, filed on Mar. 2, 2021, which claims priority to Chinese Application No. 202010172279.7, filed on Mar. 12, 2020. The entire disclosures of the above applications are incorporated herein by reference.

FIELD OF THE DISCLOSURE

The present disclosure relates to a technical field of charging, and in particular, to a power supply device and a charging control method.

BACKGROUND

An AC-DC power supply device (such as a power adapter) can convert an alternating-current power to a direct-current power for charging mobile phones, laptops, and other devices. An AC-DC power supply device includes a transformer, and a control circuit is arranged on the primary side of the transformer. Due to the high voltage on the primary side, a package of a required high-voltage withstanding device is usually large. Accordingly, the size of the power adapter is larger, which is inconvenient for portability and degrading user experience.

SUMMARY

One objective of embodiments of the present disclosure is to provide a power supply device and a charging control method.

Other features and advantages of the present disclosure are introduced in the following detailed description, or learned in part by practice of the present disclosure.

One embodiment of the present disclosure is directed to a power supply device. The power supply device includes a transformer, a first rectifier circuit, a first voltage conversion module, and a control unit. The transformer includes a primary winding and a secondary winding. The first rectifier circuit is connected to the primary winding of the transformer and configured to convert a received alternating-current voltage to a first direct-current voltage. The transformer is configured to convert the first direct-current voltage to a second direct-current voltage. The first voltage conversion module is connected to the secondary winding of the transformer and configured to convert the second direct-current voltage to output a third direct-current voltage. The control unit is connected to the first voltage conversion module and configured to control the first voltage conversion module to adjust an output voltage and/or an output current of the power supply device.

Another embodiment of the present disclosure is directed to a charging control method applied to a power supply device. The method includes: on a primary side of a transformer, converting a received alternating-current voltage to a first direct-current voltage; converting the first direct-current voltage to a second direct-current voltage through the transformer; on a secondary side of the transformer, converting the second direct-current voltage by a first voltage conversion module to output a third direct-current voltage; and controlling the first voltage conversion module to adjust an output voltage and/or an output current of the power supply device.

It should be understood that the foregoing general description and the following detailed description are exemplary and explanatory only and are not limiting of the present disclosure.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF EMBODIMENTS

Figure 1:
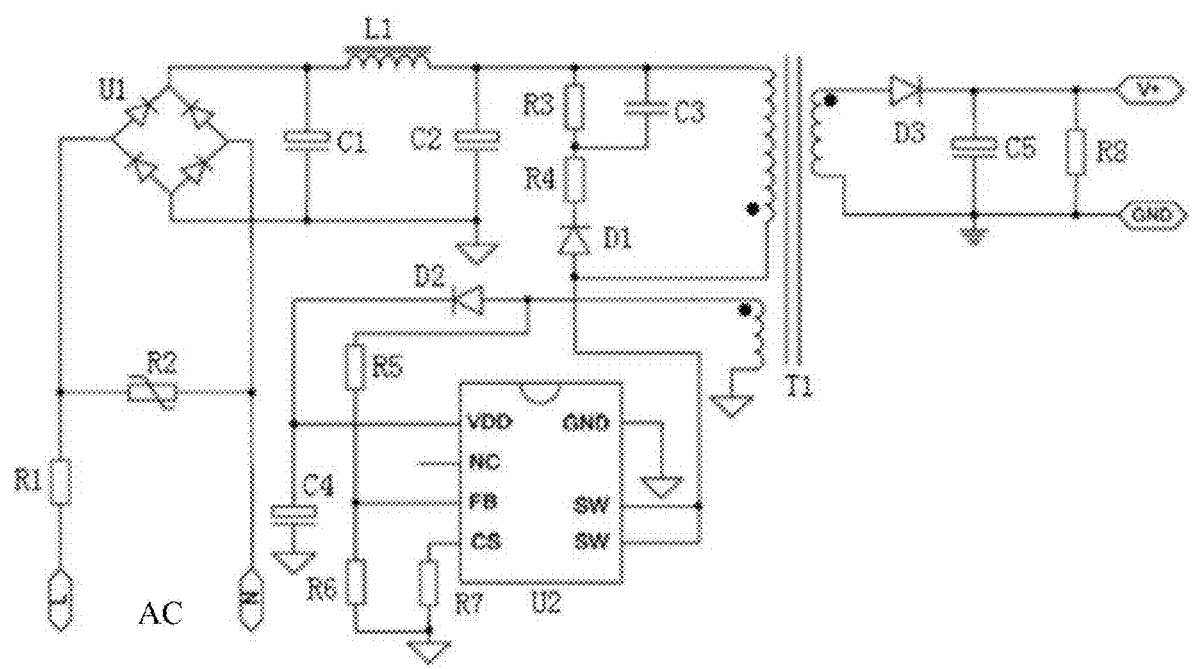
FIG. 1 is a schematic circuit diagram of an AC-DC power supply device in the related art.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present disclosure, and are not to be construed as limiting the scope of the present disclosure.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features.

FIG. 1 is a schematic circuit diagram of an AC-DC power supply device in the related art. AC power is input through an AC terminal. The AC power of 220V/50 Hz is taken as an example. The waveform of the input AC power is a 220V sine wave. Through a full-bridge rectifier U1 composed of four diodes, the input alternating-current power is rectified as an arc-shaped wave. The primary winding of the transformer T1 is connected to the switching pin SW of the switching power supply chip U2. A Pulse Width Modulation (PWM) square wave with a high frequency output by the switching pin SW is used to modulate the arc-shaped wave output by the rectifier U1. The feedback is obtained by a separate winding and input to the feedback pin FB of the switching power supply chip U2 so that the output voltage of the secondary side is stable.

An electrical apparatus (such as a chargeable device) may require an AC-DC power supply device for providing output voltages with different voltage values. For example, when a terminal that supports the power delivery (PD) protocol or the quick charge (QC) protocol requires an adapter for providing direct-current voltages with different voltage values, the AC-DC power supply device needs to communicate with the electrical apparatus through a communication chip. The electrical apparatus sends the required voltage value to the AC-DC power supply device. The AC-DC power supply device adjusts the pulse width or frequency of the output PWM signal according to the required voltage value, and obtains the feedback voltage from the winding of the transformer. The AC-DC power supply device also adjusts the pulse width or frequency of the PWM signal according to the feedback voltage, thereby obtaining a stable output voltage.

According to the above description, it can be understood that the control circuit for adjusting the output voltage is located at the primary side of the transformer. Because the voltage on the primary side is relatively high, and the package of the required voltage withstanding device is usually relatively large.

The power supply device and the charging control method of the present disclosure will be described in more detail with reference to the accompanying drawings and embodiments.

Figure 2:
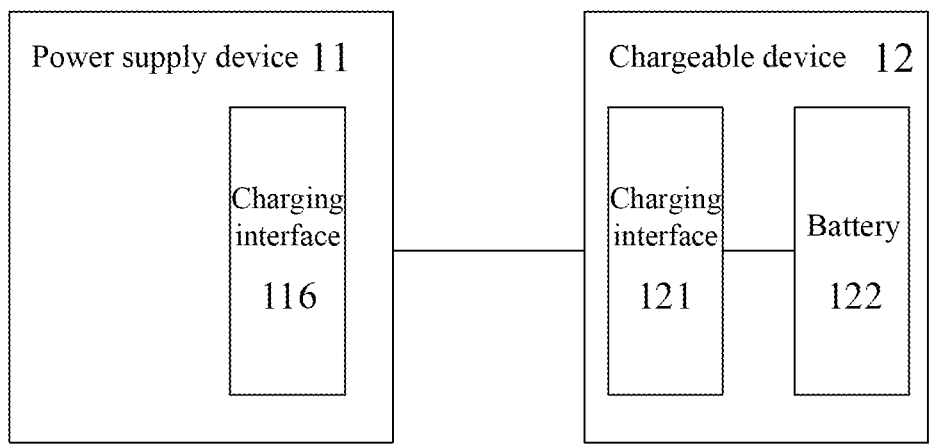
FIG. 2 is a schematic diagram of a charging system according to an exemplary embodiment of the present disclosure.

FIG. 2 is a schematic diagram of a charging system according to an exemplary embodiment of the present disclosure.

A charging system 1 comprises a power supply device 11 and a chargeable device 12.

The power supply device 11 is, for example, a power adapter, a power bank, or other equipment.

The power supply device 11 is connected to the chargeable device 12 through a wire and provides power to the chargeable device 12 for charging a battery 122 in the chargeable device 12.

The chargeable device 12 may be a terminal or an electronic apparatus. The terminal or electronic apparatus may be a mobile terminal, such as a mobile phone, a game console, a tablet computer, an e-book reader, a smart wearable apparatus, a Moving Picture Experts Group Audio Layer IV (MP4) player, a smart home apparatus, an Augmented Reality (AR) apparatus, and a Virtual Reality (VR) apparatus, or an electronic apparatus with a charging function, such as a mobile power sources (such as a power bank, a travel charger), an electronic cigarette, a wireless mouse, a wireless keyboard, a wireless headphone, and a Bluetooth speaker, or a personal computer (PC), such as a laptop portable computer and a desktop computer.

The chargeable device 12 is connected to a charging interface 116 in the power supply device 11 through a charging interface 121.

The charging interface 121 may be, for example, a female connector of a USB 2.0 interface, a Micro USB interface, or a USB TYPE-C interface. In some embodiments, the charging interface 121 may be a female connector of a lightning interface, or any other type of parallel port or serial port that can be used for charging.

The charging interface 116 may be a male connector of a USB 2.0 interface, a Micro USB interface, a USB Type C interface, or a Lightning interface that adapts to the charging interface 121.

The power supply device 11 may communicate with the chargeable device 12 through the charging interface 116 and the charging interface 121, and neither of them requires additional communication interfaces or other wireless communication modules. If the charging interface 116 and the charging interface 121 are USB interfaces, the power supply device 11 and the chargeable device 12 can communicate with each other based on the data lines (such as D+ and/or D− lines) in the USB interface. If the charging interface 116 and the charging interface 121 are USB interfaces (such as USB TYPE-C interfaces) that support the power delivery (PD) communication protocol, the power supply device 11 and the chargeable device 12 can communicate with each other based on the PD communication protocol. In addition, the power supply device 11 and the chargeable device 12 may also communicate through other communication means other than the charging interface 116 and the charging interface 121. For example, the power supply device 11 and the chargeable device 12 communicate with each other through wireless means, such as near field communication (NFC).

Figure 3:
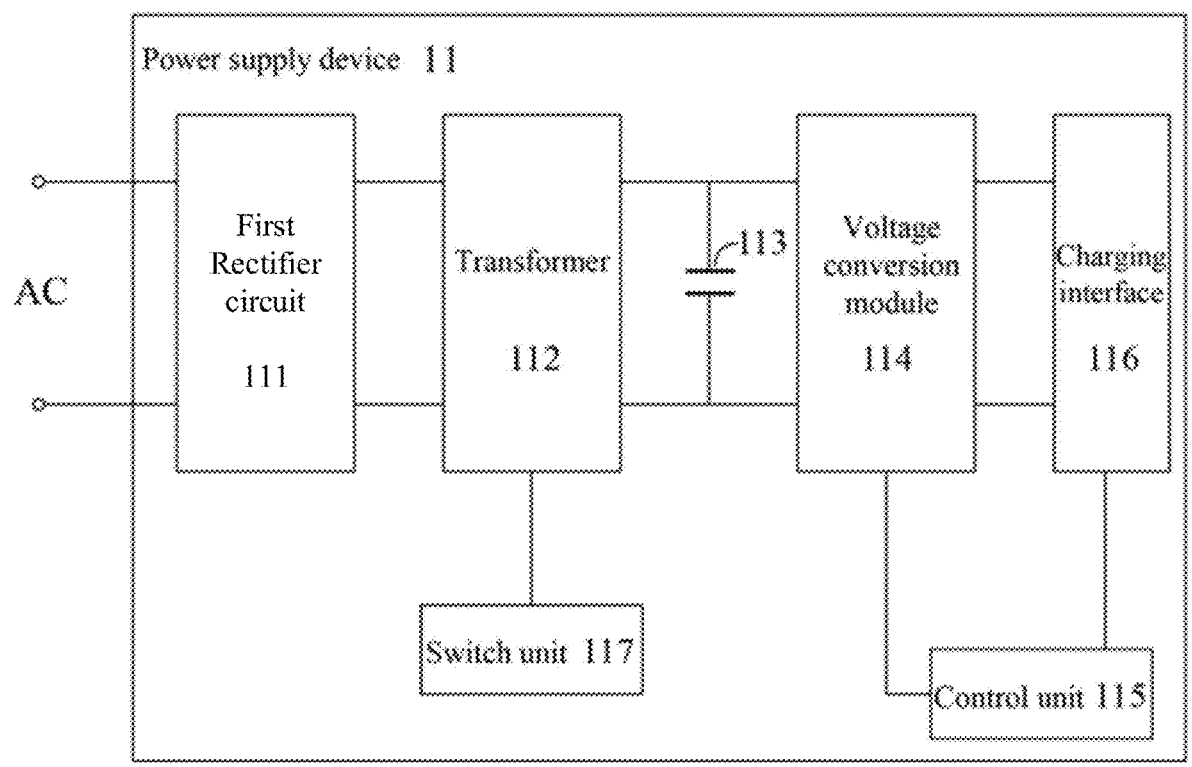
FIG. 3 is a schematic structure diagram of a power supply device according to an exemplary embodiment of the present disclosure.

FIG. 3 is a schematic structure diagram of a power supply device according to an exemplary embodiment of the present disclosure.

A power supply device 11 comprises a first rectifier 111, a transformer 112, an input capacitor 113, a voltage conversion module 114, a control unit 115, and a charging interface 116.

The first rectifier 111 is arranged on the primary side of the transformer 112 and configured to convert an alternating-current voltage received from an AC port to a first direct-current voltage. For example, the first direct-current voltage is a pulsating direct-current voltage.

Figure 4:
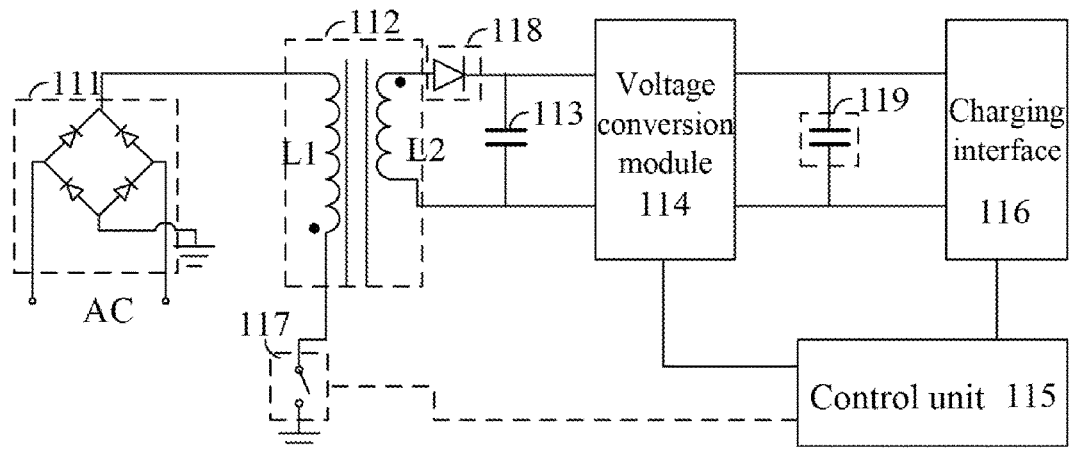
FIG. 4 is a schematic structure diagram of another power supply device according to an exemplary embodiment of the present disclosure.

FIG. 4 is schematic circuit diagram of another power supply device according to an exemplary embodiment. The first rectifier circuit 111 may be, for example, a full-bridge rectifier, however, the present disclosure is not limited thereto. The first rectifier circuit 111 may be a half-bridge rectifier or another type of rectifier circuits.

The transformer 112 comprises a primary winding L1 and a secondary winding L2. The first rectifier circuit 111 is connected to the primary winding L1 of the transformer 112.

Referring to FIG. 3 and FIG. 4, the voltage conversion module 114 is arranged on the secondary side of the transformer 112. The voltage conversion module 114 is connected to the secondary winding L2 of the transformer 112.

The transformer 112 is configured to convert a first direct-current voltage into a second direct-current voltage. The second direct-current voltage is a pulsating direct-current voltage.

In some embodiments, an input capacitor 113 may be arranged between the voltage conversion module 114 and the transformer 112. The input capacitor 113 can prevent the pulsating direct-current voltage, which is input to the voltage conversion module 114, from being too low, thereby ensuring the normal operation of the voltage conversion module 114.

Alternatively, it may be ensured that the input voltage of the voltage conversion module 114 is not too low through the control on the primary side of the transformer 112. For example, a control module is arranged on the primary side of the transformer 112 to control the input voltage that is input to the voltage conversion module 114 from being too low.

The voltage conversion module 114 is used to convert the input pulsating DC voltage to output a constant direct-current voltage.

The voltage conversion module 114 may be, for example, a BUCK step-down circuit or a charge pump circuit. The voltage conversion module 114 further steps down and converts the pulsating direct-current voltage that has been stepped down by the transformer 112 to output a third direct-current voltage.

Alternatively, the voltage conversion module 114 may be, for example, a BOOST step-up circuit or a BUCK-BOOST circuit. When a higher voltage needs to be output, the voltage conversion module 114 steps up and converts the pulsating direct-current voltage that has been stepped down by the transformer 112 to output a third direct-current voltage.

The third direct-current voltage may be a constant direct-current voltage, however, the present disclosure is not limited thereto. According to the requirements of the application scenario, the third direct-current voltage may be, for example, a pulsating direct-current voltage.

The present disclosure does not limit the conversion ratio of the charge pump. In practical applications, the conversion ratio can be set according to actual requirements, for example, it can be set to 1:1, 2:1, or 3:1. In addition, when a higher voltage is required to be output, the conversion ratio of the charge pump may be set to 1:2 or 1:3 for the step-up operation.

Alternatively, the voltage conversion module 114 may further comprise a CUK circuit. The CUK circuit may achieve both step-up operation and step-down operation.

Figure 5A:
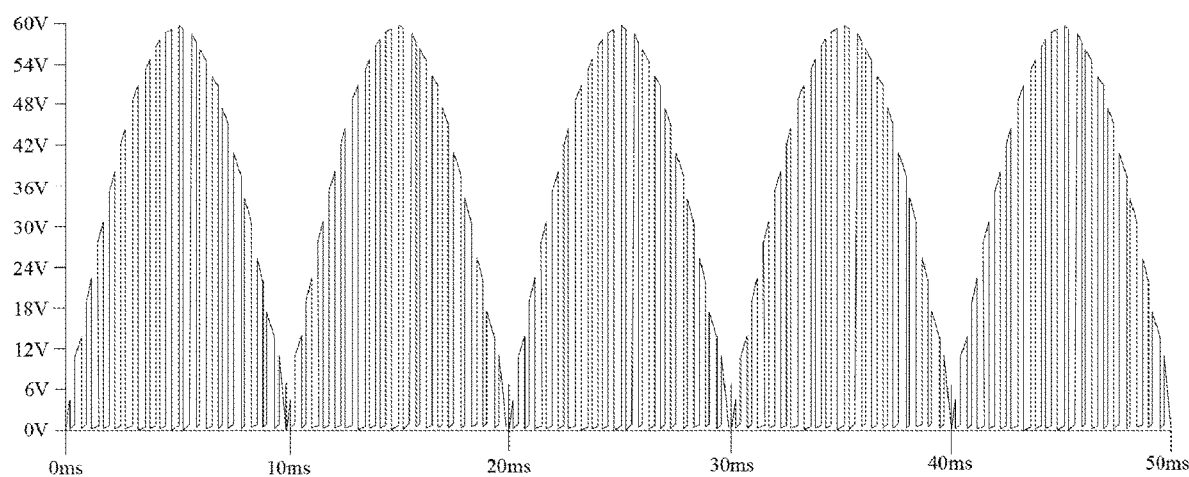
FIG. 5A illustrates a waveform of a pulsating direct-current voltage output by the secondary side of the transformer.
Figure 5B:
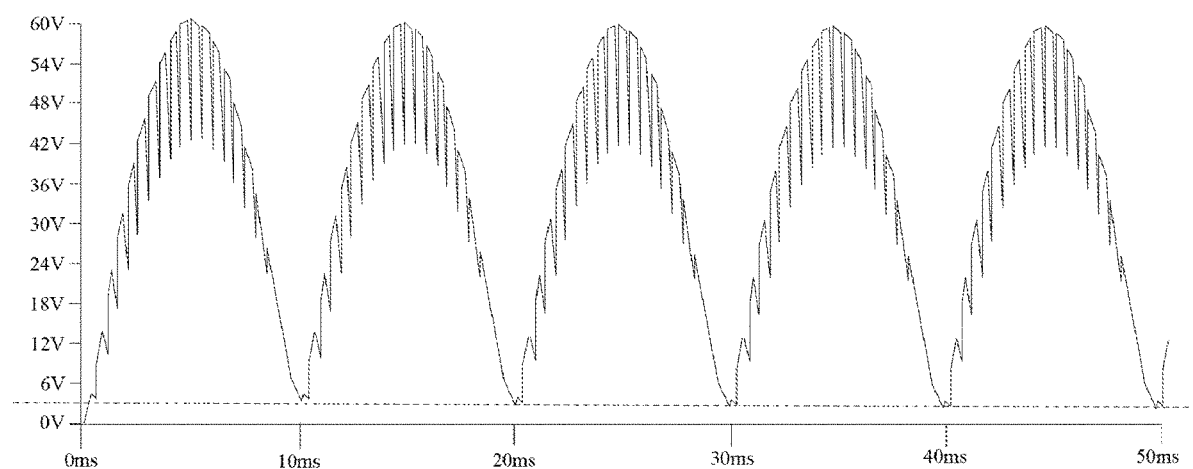
FIG. 5B illustrates a waveform of a pulsating direct-current voltage input to a voltage conversion module.

FIG. 5A shows a schematic structure diagram of a waveform of a pulsating direct-current voltage output by the secondary side of the transformer according to an example. FIG. 5B shows a schematic structure diagram of a waveform of a pulsating direct-current voltage input to a voltage conversion module according to an example.

Taking the input at the input terminal of the first rectifier circuit 111 as utility power as an example, after being rectified by the first rectifier circuit 111, it is converted to a pulsating direct-current voltage with a voltage amplitude of 220V. The waveform of the pulsating direct-current voltage with the voltage amplitude of 220V after being stepped down by the transformer 112 is shown in FIG. 5A. At 0 ms, 10 ms, etc., the voltage value is equal to or even less than 0V. In an example, the input capacitor 113 is arranged between the voltage conversion module 114 and the transformer 112. Due to the existence of the input capacitor 113, when an appropriate capacitance value is selected, the voltage value of the pulsating direct-current voltage input to the voltage conversion module 114 is not too low, so as to ensure the normal operation of the voltage conversion module 114. Taking the voltage conversion module 114 implemented by a BUCK step-down circuit as an example, when the output peak value is load power of 120 W, the input capacitor 113 of 22 μF may be selected to effectively support the operation of the BUCK circuit. As shown in FIG. 5B, the minimum voltage value is about 3V, which is the minimum operation voltage of the BUCK circuit.

Selection of an input capacitor for different voltage conversion modules in practical applications is a common knowledge in the art, and details are not repeated here. For example, when the voltage conversion module 114 is a BOOST step-up circuit and the output peak value is load power of 120 W, an input capacitor of 100 μF may be selected to effectively support the operation of the BOOST step-up circuit.

The control unit 115 is connected to the voltage conversion module 114 for controlling the voltage conversion module 114 to adjust the output voltage and/or the output current of the power supply device 11. For example, the control unit 115 may control the voltage conversion module 114 to adjust, for example, the voltage conversion ratio, thereby adjusting the output voltage and/or the output current of the power supply device 11.

The power supply device provided by the embodiment of the present disclosure does not use bulky electrolytic capacitors and high-voltage withstanding filter capacitors on the primary side of the transformer for filtering the rectified pulsating direct-current voltage. On one hand, the volume of the power supply device can be reduced. On the other hand, since the liquid electrolytic capacitors are provided with a short service life and easy to burst, removing the liquid electrolytic capacitors can improve the service life and safety of the power supply device. Moreover, by moving the voltage conversion portion to the secondary side of the transformer, the voltage conversion module is only required to process a voltage with a lower amplitude so that a stable constant direct-current voltage can be output after the conversion. The control circuit for the voltage conversion is provided on the secondary side of the transformer, which may further decrease the number of used devices and reduce the volume of the power supply device.

In some embodiment, the control unit 115 may also communicate with a chargeable device 12 through the charging interface 116, receive first feedback information sent by the chargeable device 12, and, according to the first feedback information, control the voltage conversion module 114 to adjust the output voltage and/or the output current of the power supply device 11. The first feedback information may be, for example, the expected charging voltage and/or charging current of the chargeable device 12, or an adjustment command which is generated by the chargeable device 12 based on the expected charging voltage and/or charging current. The command, for example, a command for increasing or decreasing the output voltage and/or the output current.

In the AC-DC power supply device shown in FIG. 1, since the voltage conversion process is performed on the primary side of the transformer, the adjustment process based on the feedback of the electrical apparatus is usually achieved through feeding the expected voltage by the electrical apparatus back to the control chip in the AC-DC power supply device, adjusting the pulse width or frequency of the PWM by the control chip according to the feedback of the electrical apparatus, obtaining the sampled voltage fed back from the transformer by the control chip, and further adjusting the pulse width or frequency of the PWM by the control chip according to the sampled voltage, thereby outputting a stable voltage. The feedback loop is long, and the real-time adjustment is poor. Moreover, the transformer feeds back an arc-shaped wave signal with a small voltage amplitude, but the final requirement is a direct-current signal output. Sampling the arc-shaped wave for adjusting and stabilize the direct-current signal output results in poor accuracy.

In the embodiment of the present disclosure, the control unit 115 controls the voltage conversion module on the secondary side of the transformer directly according to the information fed back by the chargeable device 12, so as to adjust the output voltage and/or the output current of the power supply device 11. On one hand, there is no need to feed signals back to the primary side (i.e., the high voltage side) of the transformer through the secondary side of the transformer, which saves devices for the transmission of the feedback signals, such as an optocoupler, shortens the feedback transmission path, and improves the real-time feedback. On the other hand, the voltage conversion module on the secondary side of the transformer is directly controlled based on the feedback information to adjust the output of the constant direct-current voltage, which results in high adjustment accuracy.

Referring to FIG. 3 and FIG. 4, the power supply device 11 further comprises a switch unit 117 that is connected to the primary winding L1 of the transformer 112 for chopping and modulating the pulsating direct-current voltage input to the primary winding L1 according to a high-frequency control signal. The switch unit 117 may be composed of, for example, a MOS transistor. The switch unit 117 is controlled by the high-frequency control signal so that the pulsating direct-current voltage can be chopped and modulated. A high-frequency signal may be provided to the transformer 112 so that the transformer 112 may be implemented by a high-frequency transformer. The frequency of the high-frequency control signal may be in a range of 50 KHz~2 MHz. Compared with low-frequency transformers (mainly used for the frequency of the utility power, such as 50 Hz or 60 Hz alternating-current power), high-frequency transformers are small in size. Thus, using a high-frequency transformer may reduce the size of the power supply device.

The high-frequency control signal of the switch unit 117 may be, for example, a signal of a fixed frequency. For example, the high-frequency control signal may be output to the switch unit 117 by a signal generator that provides a fixed frequency.

The control unit 115 may be configured to output the high-frequency control signal to the switch unit 117. In addition, the control unit 115 receives second feedback information of the chargeable device 12 and adjusts the frequency of the high-frequency control signal according to the second feedback information.

The second feedback information may be, for example, the information of the current charging stage of the chargeable device and/or the information of the power level of the battery 122 of the chargeable device. In addition, the second feedback information may further comprise, for example, the information of the temperature of the battery 122 of the chargeable device 12.

A control unit may be additionally provided to control the switch unit 117.

The following paragraphs describe the charging stages of the battery during the charging process.

The charging process of the battery may comprise the following charging stages: a trickle charging stage, a constant current charging stage, and a constant voltage charging stage.

In the trickle charging stage, the battery that has been discharged to a preset voltage threshold is pre-charged (i.e., recovery charging). The trickle charging current is usually one tenth of the constant current charging current. When the battery voltage rises to be above a trickle charging threshold, the charging current increases, and the charging process enters the constant current charging stage.

In the constant current charging stage, the battery is charged with a constant current, and the battery voltage rises rapidly. When the battery voltage reaches an expected voltage threshold (or cut-off voltage) of the battery, the charging process enters the constant voltage charging stage.

In the constant voltage charging stage, the battery is charged at a constant voltage, and the charging current gradually decreases. When the charging current decreases to a set current threshold (the current threshold is usually one tenth of the value of the charging current in the constant current charging stage or lower, or optionally the current threshold may be tens of milliamps or lower), the battery is fully charged.

In addition, after the battery is fully charged, due to the influence of the self-discharge of the battery, the partial current loss may occur. At this time, the charging process enters a supplementary charging stage. In the supplementary charging stage, the charging current is very small for ensuring that the battery is fully charged.

The constant current charging stage in the embodiment of the present disclosure does not require that the charging current remains completely constant. However, it may generally mean that the peak value or average value of the charging current remains unchanged for a period of time.

In practice, the constant current charging stage may be achieved by a multi-stage constant current charging manner for the charging operation.

The multi-stage constant current charging comprises M constant current stages (M is an integer not less than 2). The multi-stage constant current charging starts from the charging of the first stage with a predetermined charging current. The M constat current stages of the aforementioned multi-stage constant current charging are executed sequentially from the first stage to the M-th stage. After the previous constant current stage among the constant current stage turns into the next constant current stage, the current becomes smaller. When the battery voltage reaches the charging voltage threshold corresponding to the present constant current stage, it goes to the next constant current stage. The current conversion process between two adjacent constant current stages may be gradual, or it can be a step-like jumping change.

According to the above description, during the charging process of the battery, in the constant current charging stage, the charging current is the maximum, and the electric energy provided by the power supply device is the maximum so that the battery voltage increases rapidly. In the constant current charging stage, the switching frequency of the switch unit 117 may increase, that is, the frequency of the high-frequency control signal may increase, so as to speed up the extraction of energy.

In the trickle charging stage and/or the constant voltage charging stage, since the required charging current is small, the switching frequency of the switch unit 117 may decrease, that is, the frequency of the high-frequency control signal may decrease, so as to slow down the extraction of energy.

Similarly, when the volume of the battery 122 is low, the frequency of the high-frequency control signal may increase to speed up the extraction of energy. When the volume of the battery 122 is high, the frequency of the high-frequency control signal may decrease to slow down the extraction of energy.

The determination of the volume of the battery 122 may be implemented, for example, by presetting a threshold or a threshold range for the electric quantity.

Although the trickle charging stage, the constant current charging stage, and the constant voltage charging stage are used as examples in the above description, the "charging stages" described in the present disclosure are not limited to these, and they may be other charging stages.

In addition, the control unit 115 may further control the switch unit 117 according to the monitored input voltages of the voltage conversion module 114 so that the input voltages of the voltage conversion module 114 can meet the requirement of the voltage range for the operation, or the adjusted input voltages can cause the voltage conversion module 114 to be in an operating state with higher efficiency.

Referring to FIG. 4, the power supply device 11 may further comprise a second rectifier circuit 118, such as a diode. The second rectifier circuit 118 is connected to the secondary winding L2 of the transformer 112 for rectifying the pulsating direct-current voltage output by the transformer 112.

In addition, the power supply device 11 may further comprise a filter capacitor 119 that has small-capacity or small-volume to filter the constant direct-current voltage output by the voltage conversion module 114, such as filtering out the glitch of the output voltage, thereby improving the quality of the output voltage.

As shown in FIG. 5B, when the second direct-current voltage is a pulsating voltage, and its voltage value is sometimes high and sometimes low. The third direct-current voltage that is output after being converted by the voltage conversion module 114 is adjusted according to the expected charging voltage and/or charging current fed back by the chargeable device 12. In different application environments, according to the expected charging voltage and/or charging current that may be fed back by the chargeable device 12, the voltage conversion module 114 may sometimes need to perform a step-up process and sometimes need to perform a step-down process. In order to solve this problem, the present disclosure further provides a power supply device.

Figure 6:
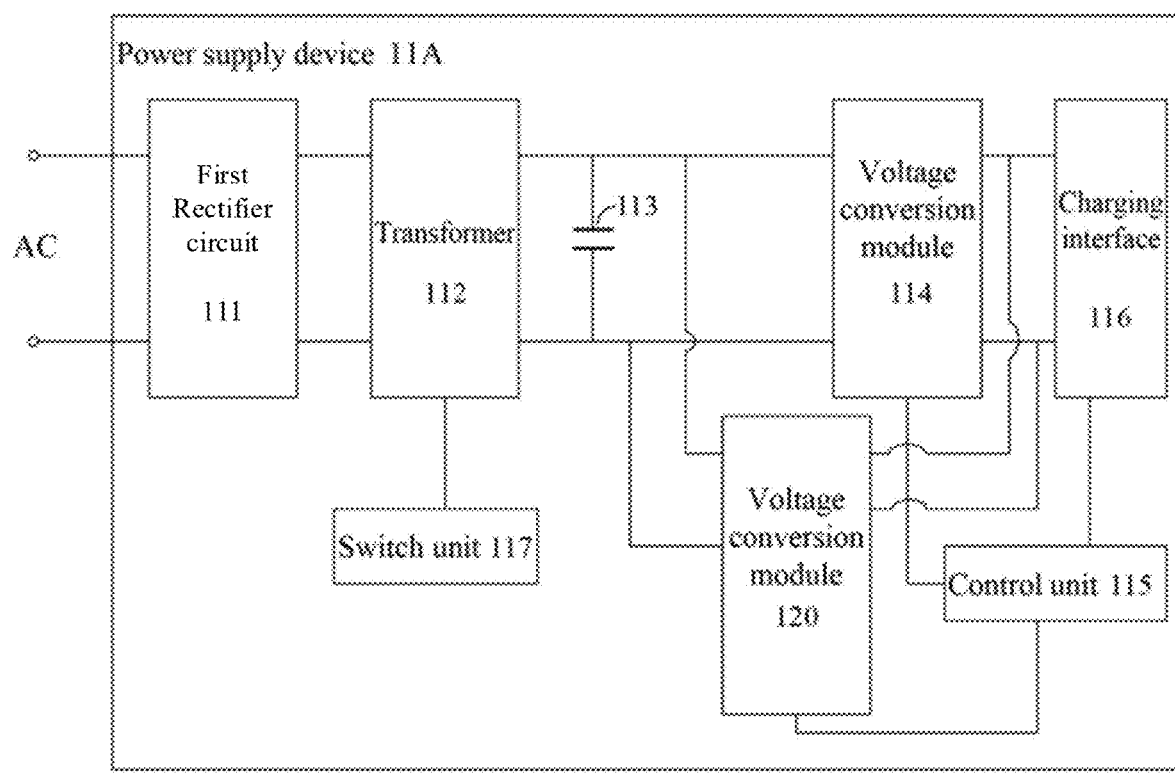
FIG. 6 is a schematic structure diagram of still another power supply device according to an exemplary embodiment of the present disclosure.

FIG. 6 is a schematic structure diagram of still another power supply device according to an exemplary embodiment of the present disclosure.

Compared with FIG. 3, the power supply device 11A further comprises a voltage conversion module 120.

The voltage conversion module 120 is also arranged on the secondary side of the transformer 112.

Figure 7:
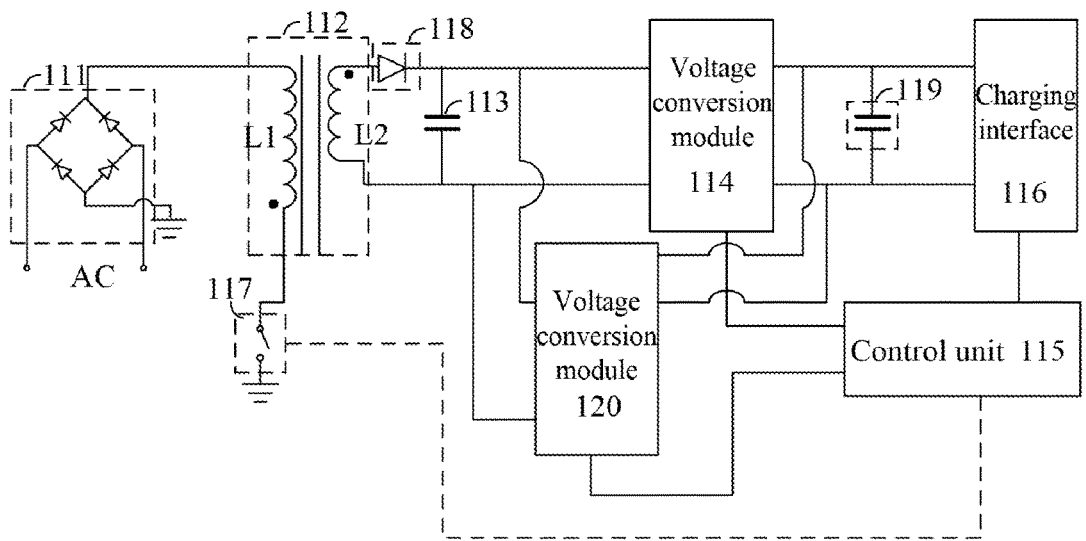
FIG. 7 is a schematic structure diagram of yet another power supply device according to an exemplary embodiment of the present disclosure.

FIG. 7 is a schematic structure diagram of yet another power supply device according to an exemplary embodiment of the present disclosure. Referring to FIG. 6 and FIG. 7, the voltage conversion module 120 is connected to the secondary winding L2 of the transformer 112 through the input capacitor 113.

During operation, alternatively, one of the voltage conversion module 114 and the voltage conversion module 120 converts the second direct-current voltage to output the third direct-current voltage.

The control unit 115 is further configured to control the voltage conversion module 114 or the voltage conversion module 120 to adjust the output voltage and/or the output current of the power supply device 11A.

In some embodiments, the voltage conversion module 114 and the voltage conversion module 120 may determine whether to convert the second direct-current voltage by themselves. For example, both the voltage conversion module 114 and the voltage conversion module 120 have built-in control circuits that store a preset voltage threshold respectively. When the voltage value of the second direct-current voltage is higher than the voltage threshold, the voltage conversion module 114 operates to convert the second direct-current voltage to output the third direct-current voltage; when the voltage value of the second direct-current voltage is lower than the voltage threshold, the voltage conversion module 120 operates to convert the second direct-current voltage to output the third direct-current voltage.

Moreover, in some embodiments, the control unit 115 may record the voltage threshold and compare the voltage threshold with the second direct-current voltage for controlling the voltage conversion module 114 or the voltage conversion module 120 to convert the second direct-current voltage, thereby outputting the third direct-current voltage. Similarly, for example, when the voltage value of the second direct-current voltage is higher than the voltage threshold, the control unit 115 controls the voltage conversion module 114 to convert the second direct-current voltage and output the third direct-current voltage; when the voltage value of the second direct-current voltage is lower than the voltage threshold, the control unit 115 controls the voltage conversion module 120 to convert the second direct-current voltage and output the third direct-current voltage.

For example, the voltage threshold may be set as a fixed threshold, or may be set as an updateable threshold. When the chargeable device 12 requires different charging voltages, the voltage threshold may be determined based on the expected charging voltage fed back by the chargeable device 12. That is, when the expected charging voltage is high, the voltage threshold increases correspondingly; when the expected charging voltage is low, the voltage threshold lowered correspondingly. In one embodiment, the voltage threshold may be set to the expected charging voltage. For example, the desired charging voltage may be obtained by the control unit 115 through communication with the chargeable device 12.

The voltage conversion module 114 may be configured as a step-down circuit including, for example, a BUCK, a BUCK/Boost, a charge pump, or a CUK. The voltage conversion module 120 may be configured as a step-up circuit including, for example, a Boost, a BUCK/Boost, a charge pump, or a CUK.

In addition, the control unit 115 may further control a switch unit 117 according to the monitored input voltages of the voltage conversion module 114 and the voltage conversion module 120 so that the input voltages of the voltage conversion module 114 and the voltage conversion module 120 can meet the requirements of the voltage ranges for the their operation. Or the adjusted input voltages can cause the voltage conversion module 114 and the voltage conversion module 120 to be in an operating state with higher efficiency.

The following method embodiments of the present disclosure may be applied to the device embodiments of the present disclosure. For details not disclosed in the method embodiments of the present disclosure, please refer to the device embodiments of the present disclosure.

Figure 8:
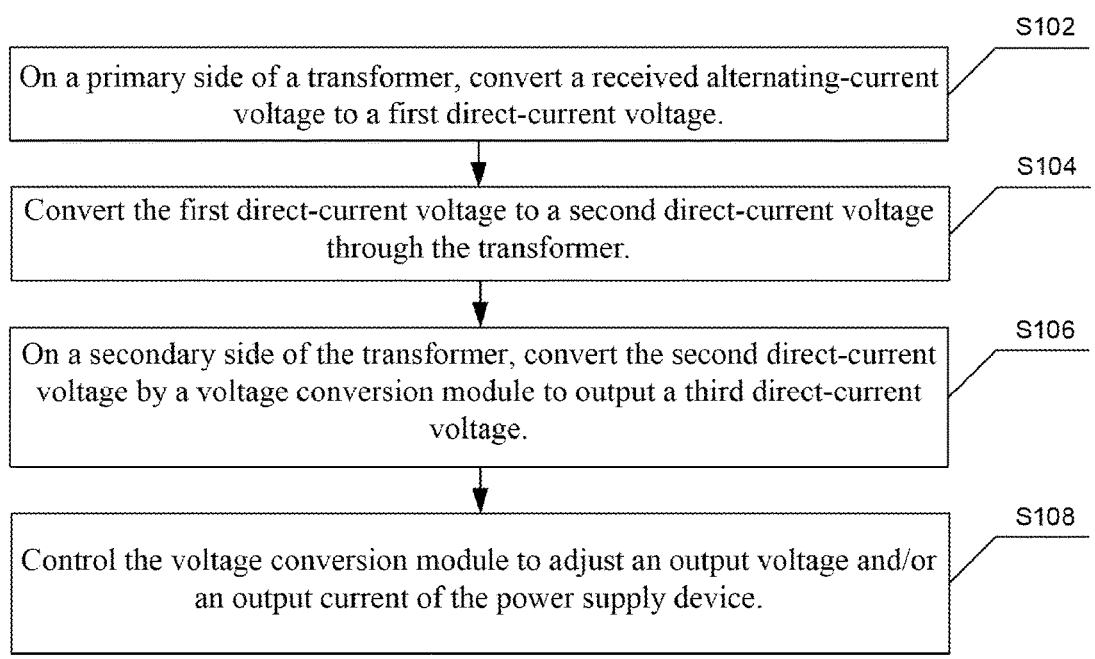
FIG. 8 is a flowchart of a charging control method according to an exemplary embodiment of the present disclosure.

FIG. 8 is a flowchart showing a charging control method according to an exemplary embodiment. The charging control method may be applied to the power supply device 11.

Referring to FIG. 8, the charging control method 10 comprises blocks S102, S104, S106 and S108.

At block S102, on a primary side of a transformer, converting a received alternating-current voltage to a first direct-current voltage.

The first direct-current voltage is, for example, a pulsating direct-current voltage.

At block S104, converting the first direct-current voltage to a second direct-current voltage through the transformer.

The second direct-current voltage is, for example, a pulsating direct-current voltage.

At block S106, on a secondary side of the transformer, converting the second direct-current voltage by a voltage conversion module to output a third direct-current voltage.

For example, the third direct-current voltage may be a constant DC voltage or a pulsating DC voltage.

At block S108, controlling the voltage conversion module to adjust an output voltage and/or an output current of the power supply device.

The charging control method provided by the embodiment of the present disclosure does not use bulky electrolytic capacitors and high-voltage withstanding filter capacitors on the primary side of the transformer for filtering the rectified pulsating direct-current voltage. On one hand, the volume of the power supply device can be reduced. On the other hand, since the liquid electrolytic capacitors are provided with a short service life and easy to burst, removing the liquid electrolytic capacitors can improve the service life and safety of the power supply device. Moreover, by moving the voltage conversion portion to the secondary side of the transformer, the voltage conversion module is only required to process a voltage with a lower amplitude so that a stable constant direct-current voltage can be output after the conversion. The control circuit for the voltage conversion is provided on the secondary side of the transformer, which may further decrease the number of used devices and reduce the volume of the power supply device.

Figure 9:
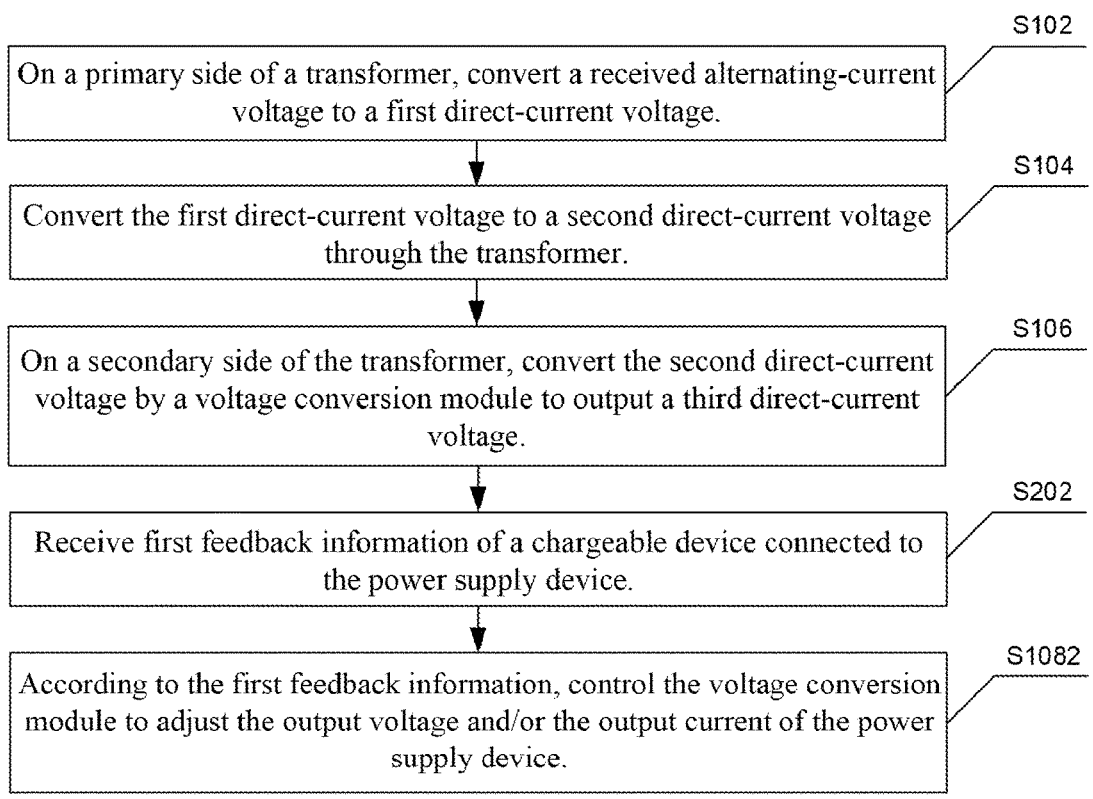
FIG. 9 is a flowchart of another charging control method according to an exemplary embodiment of the present disclosure.

FIG. 9 is a flowchart of another charging control method according to another embodiment of the present disclosure. The charging control method may be applied to the power supply device 11. Different from FIG. 8, the charging control method 20 shown in FIG. 9 further comprises a block S202.

At block S202, receiving first feedback information of a chargeable device connected to the power supply device.

In addition, the block S108 further comprises the block S1082: according to the first feedback information, controlling the voltage conversion module to adjust the output voltage and/or the output current of the power supply device.

In some embodiments, the first feedback information may comprise: an expected charging voltage and/or an expected charging current of the chargeable device, or an adjustment command which is generated by the chargeable device based on the expected charging voltage and/or the expected charging current.

The charging control method provided by the embodiment of the present disclosure directly controls the voltage conversion module arranged on the secondary side of the transformer directly according to the information fed back by the chargeable device, so as to adjust the output voltage and/or the output current of the power supply device. On one hand, there is no need to feed signals back to the primary side (i.e., the high voltage side) of the transformer through the secondary side of the transformer, which saves devices for the transmission of the feedback signals, such as an optocoupler, shortens the feedback transmission path, and improves the real-time feedback. On the other hand, the voltage conversion module on the secondary side of the transformer is directly controlled based on the feedback information to adjust the output of the constant direct-current voltage, which results in high adjustment accuracy.

Figure 10:
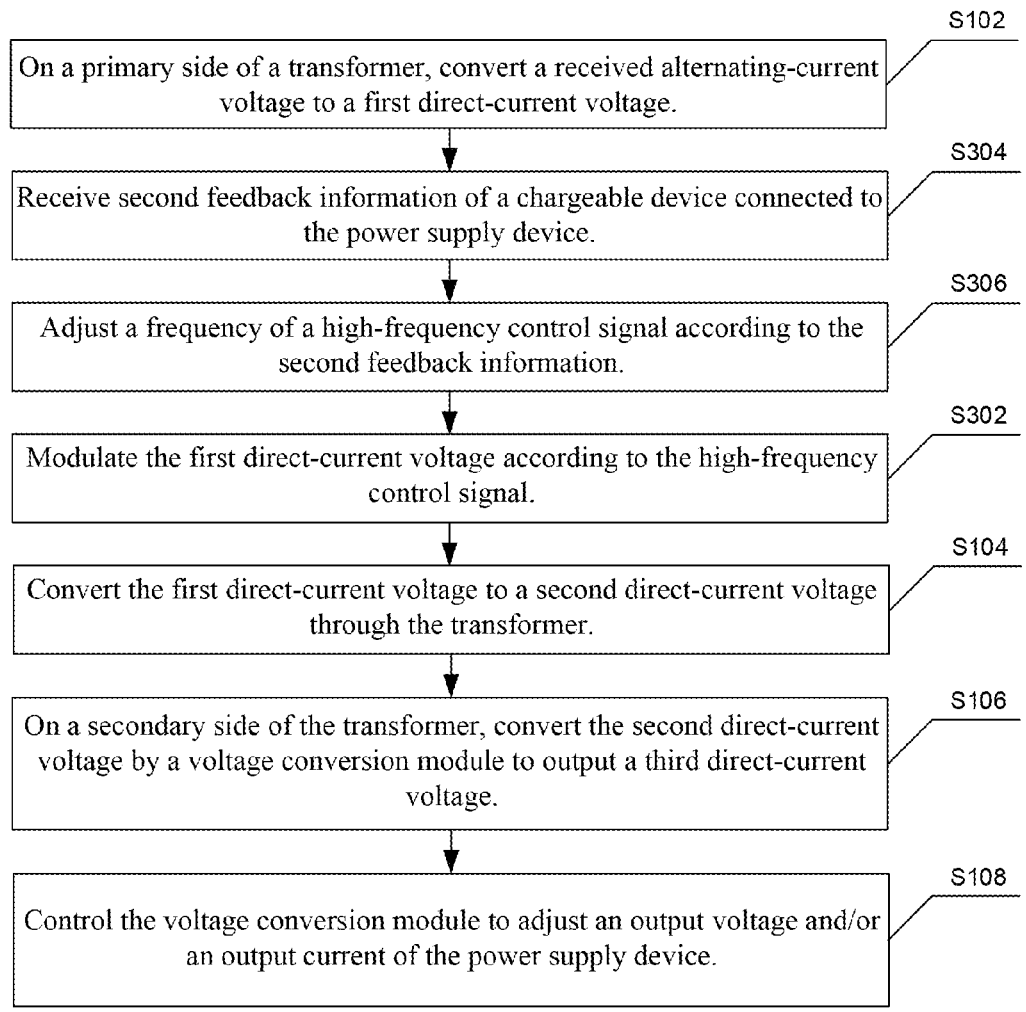
FIG. 10 is a flowchart of still another charging control method according to an exemplary embodiment of the present disclosure.

FIG. 10 is a flowchart of another charging control method according to still another embodiment of the present disclosure. The charging control method may be applied to the power supply device 11. Different from FIG. 8, the charging control method 30 shown in FIG. 10 further comprises a block S302.

At block S302, modulating the first direct-current voltage according to a high-frequency control signal.

The first direct-current voltage is chopped and modulated through the high-frequency control signal so that a high-frequency signal can be provided to the transformer and, thus, a high-frequency transformer can be selected. Compared with low-frequency transformers, high-frequency transformers are small in size. Thus, using a high-frequency transformer may reduce the size of the power supply device.

In some embodiments, the charging control method 30 may further comprise blocks S304 and S306.

At block S304, a second feedback information of the chargeable device connected to the power supply device is received.

At block S306, the frequency of the high-frequency control signal according to the second feedback information is adjusted.

The second feedback information comprises at least on item of the following information: the information of the charging stage of the chargeable device, the information of the electric quantity of the battery of the chargeable device.

Figure 11:
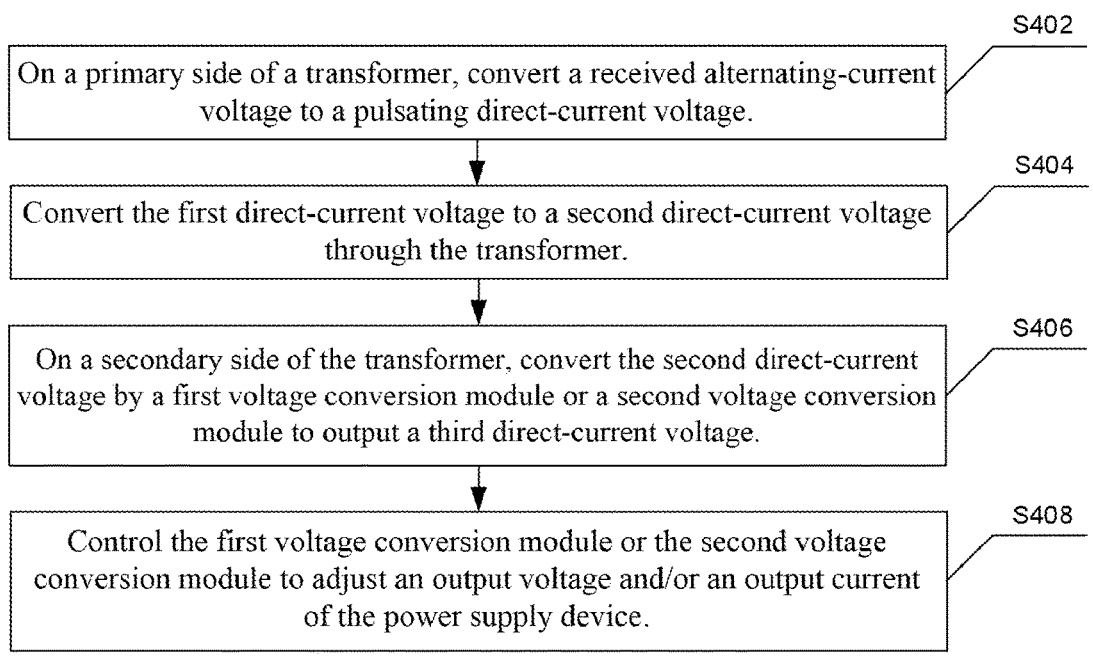
FIG. 11 is a flow chart of yet another charging control method according to an exemplary embodiment of the present disclosure.

FIG. 11 is a flowchart of another charging control method according to yet another embodiment of the present disclosure. The charging control method may be applied to the power supply device 11.

The charging control method 40 comprises blocks S402, S404, S406 and S408.

At block S402, on a primary side of a transformer, converting a received alternating-current voltage to a pulsating direct-current voltage.

The first direct-current voltage is, for example, a pulsating direct-current voltage.

At block S404, converting the first direct-current voltage to a second direct-current voltage through the transformer.

The second direct-current voltage is, for example, a pulsating direct-current voltage.

At block S406, on a secondary side of the transformer, converting the second direct-current voltage by a first voltage conversion module or a second voltage conversion module to output a third direct-current voltage.

For example, the third direct-current voltage may be a constant DC voltage or a pulsating DC voltage.

The first voltage conversion module may be, for example, the voltage conversion module 114 in the power supply device 11A, and the second voltage conversion module may be, for example, the voltage conversion module 120 in the power supply device 11A.

In some embodiments, the block S406 may comprise: converting the second direct-current voltage by the first voltage conversion module to output the third direct-current voltage when the voltage value of the second direct-current voltage is higher than a voltage threshold; converting the second direct-current voltage by the second voltage conversion module to output the third direct-current voltage when the voltage value of the second direct-current voltage is lower than the voltage threshold.

The block S406 may comprise: controlling the first voltage conversion module to convert the second direct-current voltage to output the third direct-current voltage when the voltage value of the second direct-current voltage is higher than a voltage threshold; controlling the second voltage conversion module to convert the second direct-current voltage to output the third direct-current voltage when the voltage value of the second direct-current voltage is lower than the voltage threshold.

For example, the control unit 115 in the power supply device 11A may compare the voltage threshold with the magnitude of the second direct-current voltage and determine which one of the first voltage conversion module and the second voltage conversion module converts the second direct-current voltage.

At block S408, controlling the first voltage conversion module or the second voltage conversion module to adjust an output voltage and/or an output current of the power supply device.

The method 40 further comprises: receiving an expected charging voltage fed back by the chargeable device connected to the power supply device; wherein the voltage threshold is determined according to the expected charging voltage.

It should be noted that the accompanying drawings are only schematic illustrations of the processes included in the methods according to the exemplary embodiments of the present disclosure, and are not intended to be limiting. It is easy to understand that the processes shown in the above figures do not indicate or limit the chronological order of these processes. In addition, it is also readily understood that these processes may be performed synchronously or asynchronously, for example, in multiple modules.

Exemplary embodiments of the present disclosure have been particularly shown and described above. It should be understood that the present disclosure is not limited to the details of construction, arrangements, or implementations described herein; on the contrary, this disclosure is intended to cover various modifications and equivalent arrangements included within the spirit and scope of the appended claims.

What is claimed is:

1. A power supply device, comprising:
   a transformer comprising a primary winding and a secondary winding;
   a first rectifier circuit connected to the primary winding of the transformer and configured to convert a received alternating-current voltage to a first direct-current voltage, wherein the transformer is configured to convert the first direct-current voltage to a second direct-current voltage;
   a first voltage conversion module connected to the secondary winding of the transformer and configured to convert the second direct-current voltage to output a third direct-current voltage; and
   a control unit connected to the first voltage conversion module and configured to control the first voltage conversion module to adjust an output voltage and/or an output current of the power supply device.

2. The power supply device of claim 1 further comprising:
   an input capacitor, the first voltage conversion module being connected to the secondary winding of the transformer through the input capacitor.

3. The power supply device of claim 2 further comprising:
   a second voltage conversion module connected to the secondary winding of the transformer through the input capacitor,
   wherein, alternatively, one of the first voltage conversion module and the second voltage conversion module converts the second direct-current voltage to output the third direct-current voltage,
   wherein the control unit is connected to the second voltage conversion module and further configured to control the first voltage conversion module or the second voltage conversion module to adjust the output voltage and/or the output current of the power supply device.

4. The power supply device of claim 3, wherein the first voltage conversion module is configured to convert the second direct-current voltage to output the third direct-current voltage when a voltage value of the second direct-current voltage is higher than a voltage threshold, and the second voltage conversion module is configured to convert the second direct-current voltage to output the third direct-current voltage when the voltage value of the second direct-current voltage is lower than the voltage threshold.

5. The power supply device of claim 4, wherein the control unit is further configured to receive an expected charging voltage fed back by a chargeable device connected to the power supply device, wherein the voltage threshold is determined according to the expected charging voltage.

6. The power supply device of claim 3, wherein the control unit is further configured to control the first voltage conversion module to convert the second direct-current voltage to output the third direct-current voltage when a voltage value of the second direct-current voltage is higher than a voltage threshold and further control the second voltage conversion module to convert the second direct-current voltage to output the third direct-current voltage when the voltage value of the second direct-current voltage is lower than the voltage threshold.

7. The power supply device of claim 1, wherein the control unit is further configured to receive first feedback information of a chargeable device connected to the power supply device and, according to the first feedback information, control the first voltage conversion module to adjust the output voltage and/or the output current of the power supply device.

8. The power supply device of claim 7, wherein the first feedback information comprises: an expected charging voltage and/or an expected charging current of the chargeable device, or an adjustment command which is generated by the chargeable device based on the expected charging voltage and/or the expected charging current.

9. The power supply device of claim 1 further comprising:
   a switch unit connected to the primary winding of the transformer and configured to modulate the first direct-current voltage according to a high-frequency control signal.

10. The power supply device of claim 9, wherein the control unit is connected to the switch unit, and the control unit is further configured to output the high-frequency control signal to the switch unit, receive second feedback information of a chargeable device connected to the power supply device, and adjust a frequency of the high-frequency control signal according to the second feedback information.

11. The power supply device of claim 10, wherein the second feedback information comprises at least one item of following information: information of a charging stage of the chargeable device, information of electric quantity of a battery of the chargeable device, and information of temperature of the battery.

12. The power supply device of claim 1 further comprising: a second rectifier circuit connected between the secondary winding and the first voltage conversion module and configured to rectify the second direct-current voltage.

13. A charging control method applied to a power supply device, comprising:
  on a primary side of a transformer, converting a received alternating-current voltage to a first direct-current voltage;
  converting the first direct-current voltage to a second direct-current voltage through the transformer;
  on a secondary side of the transformer, converting the second direct-current voltage by a first voltage conversion module to output a third direct-current voltage; and
  controlling the first voltage conversion module to adjust an output voltage or an output current of the power supply device.

14. The charging control method of claim 13, further comprising:
  receiving first feedback information of a chargeable device connected to the power supply device;
  wherein the controlling the first voltage conversion module to adjust an output voltage or an output current of the power supply device comprises: according to the first feedback information, controlling the first voltage conversion module to adjust the output voltage and/or the output current of the power supply device.

15. The charging control method of claim 14, wherein the first feedback information comprises: an expected charging voltage or an expected charging current of the chargeable device, or an adjustment command which is generated by the chargeable device based on the expected charging voltage and/or the expected charging current.

16. The charging control method of claim 13 further comprising:
  receiving second feedback information of a chargeable device connected to the power supply device, wherein the second feedback information comprises at least one item of following information: information of a charging stage of the chargeable device, information of electric quantity of a battery of the chargeable device, and information of temperature of the battery;
  adjusting a frequency of the high-frequency control signal according to the second feedback information; and
  modulating the first direct-current voltage according to the high-frequency control signal.

17. The charging control method of claim 13, wherein, on a secondary side of the transformer, the converting the second direct-current voltage by a first voltage conversion module to output a third direct-current voltage comprises: on the secondary side of the transformer, converting the second direct-current voltage by the first voltage conversion module or a second voltage conversion module to output the third direct-current voltage,
  wherein the controlling the first voltage conversion module to adjust an output voltage or an output current of the power supply device comprises: controlling the first voltage conversion module or the second voltage conversion module to adjust the output voltage or the output current of the power supply device.

18. The charging control method of claim 17, wherein, on the secondary side of the transformer, converting the second direct-current voltage by the first voltage conversion module or a second voltage conversion module to output a third direct-current voltage comprises:
  converting the second direct-current voltage by the first voltage conversion module to output the third direct-current voltage when a voltage value of the second direct-current voltage is higher than a voltage threshold; and
  converting the second direct-current voltage by the second voltage conversion module to output the third direct-current voltage when the voltage value of the second direct-current voltage is lower than the voltage threshold.

19. The charging control method of claim 18 further comprising:
  receiving an expected charging voltage fed back by a chargeable device connected to the power supply device,
  wherein the voltage threshold is determined according to the expected charging voltage.

20. The charging control method of claim 17, wherein, on the secondary side of the transformer, converting the second direct-current voltage by the first voltage conversion module or a second voltage conversion module to output the third direct-current voltage comprises:
  controlling the first voltage conversion module to convert the second direct-current voltage to output the third direct-current voltage when a voltage value of the second direct-current voltage is higher than a voltage threshold; and controlling the second voltage conversion module to convert the second direct-current voltage to output the third direct-current voltage when the voltage value of the second direct-current voltage is lower than the voltage threshold.

* * * * *